Oct. 8, 1963  A. SORG  3,106,481
METHOD OF COATING TEA BAG PAPER TO RENDER IT HEAT-SEALABLE
Original Filed July 3, 1956
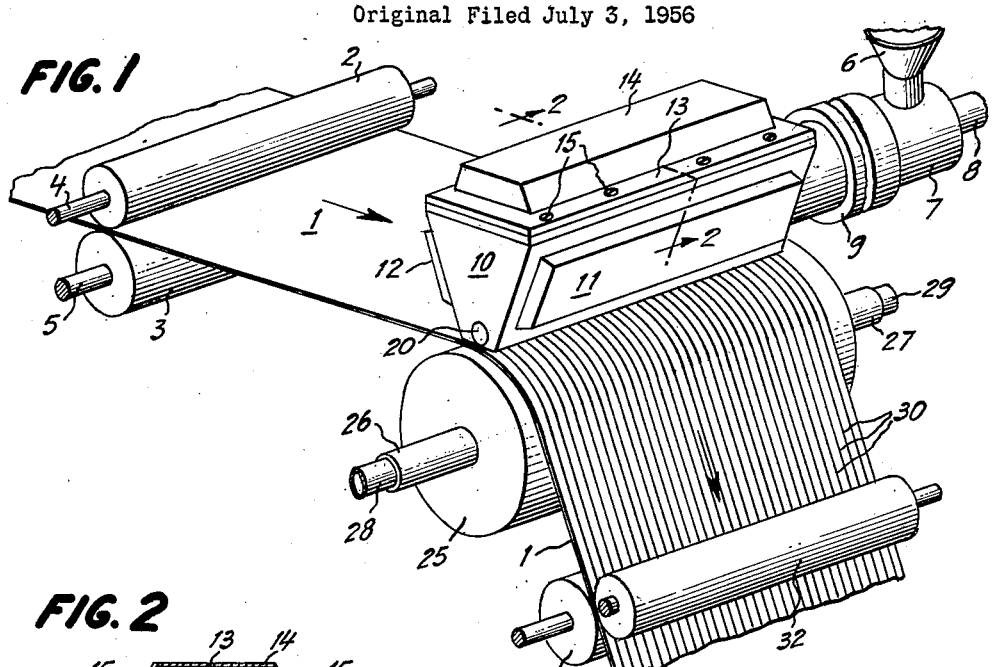
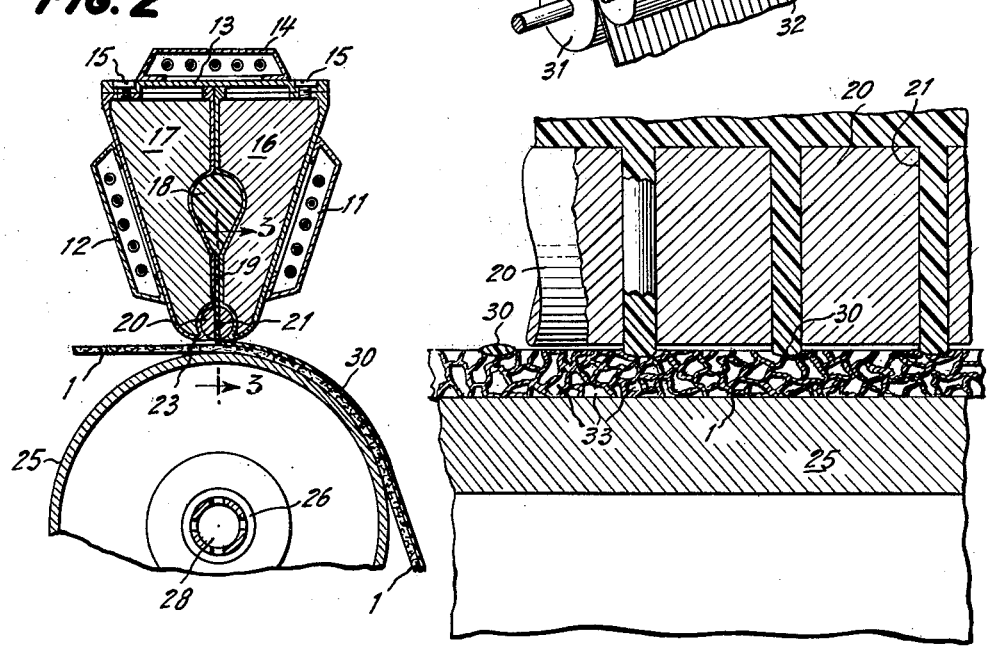
INVENTOR.
ADAM SORG
BY
Bierman + Bierman
ATTORNEYS United States Patent Office 3,106,481
Patented Oct. 8, 1963

3,106,481
METHOD OF COATING TEA BAG PAPER TO RENDER IT HEAT-SEALABLE
Adam Sorg, 15 Manchester Place, Newark 2, N.J.
Continuation of application Ser. No. 595,797, July 3, 1956. This application Aug. 24, 1959, Ser. No. 835,688
7 Claims. (Cl. 117—44)

The present invention is directed to the treatment of porous paper, such as filter paper for the purpose of providing heat sealing characteristics thereto without impairing the permeability thereof, and adapted for use in the manuafacture of tea bags. The present application is a continuation of application Serial No. 595,797, filed July 3, 1956, now abandoned, entitled "Polyethylene Tissue Extruding Process."

Among extensively used materials for forming infusion packages, for example, tea bags, has been a filter paper carrying a pattern that usually comprised a series of lines or dots usually equall spaced apart. The plastic usually employed has been a vinyl compound with acetone or the like, as a solvent. However, when such patterns are impressed on the filter paper, either by printing or by coating, it has been extremely difficul to drive off all the acetone or other solvent, even when the treated filter paper is run over heated drying rollers. Any residual acetone can readily be detected by the professional tea taster, and the extra passes of the paper over drying rollers added to the cost of the resultant tea bag paper due to the extra handling, and the heating of the paper by several passes made the paper brittle and reduced its wet strength.

According to one prior method of coating porous paper, there was provided a solution of a vinyl resin which was by means of a roller applied to a web or strip of wax paper and this was subsequently contacted by a tissue or filter paper in order to form a laminated product. The latter was then passed between rolls, the wax paper removed from the filter paper and presumably some of the vinyl resin solution remained on the filter paper, which was then heated to remove the solvent. This process had very serious disadvantages in that after a short time the roller for applying the resin solution became gummy so that the deposition of the solution on the wax paper became erratic. In the laminated intermediate product, the solvent caused migration of the solution throughout the filter paper. Then in the separation of the two elements, tearing of the filter paper took place. In the subsequent heating the filter paper there was additional migration into the interior so that heat sealing was ineffective because of the lack of sufficient resin on the surface of the paper.

In another prior art process for the production of artificial leather, a solution of a celulose ester in a volatile solvent was coated on a fabric or the like base. The fabric itself was preheated and the resin contained plasticizers, oils and volatile solvents. It was applied in a plastic condition to the fabric and pressed into the surface thereof in order to fully impregnate the fabric. The fabric was then heated to a relatively high temperature, which caused the plastic solution to become distributed uniformly throughout the fabric and subsequently to volatilize the solvent. Such penetration into the fabric would destroy the possibility of use in making tea bags and the object of the process was to provide a non-porous and impervious surface. It was impossible to remove all of the solvent so that an undesirable taste would be imparted to tea contained in such a product. The impregnating material had toxicity which would eliminated it for use in tea bags.

The present invention is intended and adapted to overcome the difficulties and disadvantages inherent in the prior art, it being among the objects of the present invention to provide a method whereby a suitable plastic material may be deposited on the web of filter paper in spaced areas rapidly and substantially automatically while retaining a high degree of water permeability.

It is also among the objects of the present invention to provide a method wherein the plastic material used is substantially free from plasticizer and volatile solvent, whereby the product is tasteless and odorless and the wet strength of the product is high.

It is further among the objects of the present invention to so control the conditions of operation as to prevent the striking through of the plastic material and to provide an adequate amount thereof to give excellent heat sealing properties to the paper.

In the making of tea bag paper there are a number of critical factors not present in other types of plastic products. It is desirable to avoid too much penetration of the plastic into the paper as this tends to destroy the heat sealing properties. The plastic material must not be tacky or semi-solid; it must be non-toxic and have no taste or odor. Because the paper used is highly porous, it tends to draw in the plastic material due to the capillary attraction so that there is a serious tendency to cause the plastic material to spread and fill the pores of the paper.

According to the present invention, there is used a plastic material which is non-toxic, has a low melting point, is not viscous or tacky and is adapted to increase the wet strength of the paper. It has been found that polyethylene is an ideal material for this purpose. It may be applied over a relatively small proportion of the surface of the paper with but slight penetration and retaining the porosity of the paper to an extent of about 65 to 75%; in other words, the plastic material covers not over about 25%–35% of the area of the filter paper.

In accordance with the invention there is provided a body of the thermoplastic material in a suitable closed vessel, having a number of openings at the bottom thereof. The vessel is heated sufficiently to soften the plastic material and pressure is applied to cause it to flow through the openings and onto the web of filter paper. The paper is unheated and passes continuously under the vessel so that lines of plastic material are deposited thereon but such deposition is without pressure, although the plastic material in the vessel is under pressure. Thereby the plastic material penetrates only partially into the surface of the paper. Simultaneously with the deposition, the other side of the paper is chilled, thereby preventing diffusion of the plastic material through the paper. However, there is sufficient penetration to firmly anchor the plastic material to the paper and thus provide a high degree of heat sealability.

In accompanying drawings constituting a part hereof and in which like reference characters indicate like parts, FIG. 1 is a perspective view of an apparatus adapted to carry out the present process, the showing being somewhat diagrammatic;

FIG. 2 is a transverse cross-sectional view taken along line 2—2 of FIG. 1, some parts being broken away;

FIG. 3 is a transverse cross-sectional view taken along line 3—3 of FIG. 2 and being greatly enlarged.

There is provided a relatively wide strip of paper 1 which is usually of a high quality tissue or filter paper having a high degree of porosity. It is fed between rolls 2 and 3 mounted on shafts 4 and 5, respectively, in proximity of the lower end of an applicator. It consists of a hopper 6 for plastic material leading into a screw conveyor 7 operated by shaft 8, and surrounded by a band electric heater 9. The die 10 has electric heating elements 11 and 12 on the sides thereof. Cover 13, having an electric heating element 14, is secured to die 10 by bolts 15. The die itself is split and consists of parts 16 and 17, between which is formed opening 18 into which the plastic material is extruded. A longitudinal slot 19 connects opening 18 with die lip 20 of hardened alloy steel. The lip has a series of alined vertical holes 21 shown in FIG. 3, through which the plastic material 22 is adapted to be forced onto web 1.

Directly beneath holes 21 and the bottom 23 of die 10 is a hollow drum 25 over which web 1 passes. The drum is provided with hollow stub shafts 26 and 27 whereby it may be rotated. Cooling liquid is introduced through pipe 28 into drum 25 and emerges through pipe 29.

In the operation of the process, the plastic material in granular form and substantially free from volatile solvent and plasticizer, is fed into hopper 6, shaft 8 is rotated, heat is applied to band heater 9 to begin to soften the plastic, and forcing it into closed die 10. Web 1 is passed continuously over the surface of drum 25, the pressure of the conveyor 7 forcing thin streams or lines 30 of the plastic material onto the upper face of web 1 through die lip 20. Simultaneously with the deposition, the chilling effect of drum 25 is exerted so that the plastic material is immediately chilled upon its initial penetration into the upper surface of web 1 as shown in FIG. 3. The web then passes between rollers 31 and 32 whereby slight compression of the lines of plastic material takes place, forming bodies of oval cross-section. Because of the immediate chilling of the plastic material, the absence of substantial amounts of plasticizers and the absence of volatile solvents, pores 33 of the web 1 are left largely open so that the permeability of the paper is not impaired.

Although the invention has been described setting forth a single embodiment thereof, it is not to be limited thereto as various changes in the operating details may be made without departing from the spirit thereof. For instance other synthetic plastic materials having the desired properties may be substituted for the polyethylene. In some cases, if the plastic is too brittle, a moderate amount of non-volatile plasticizer may be incorporated therein. The extruding of the plastic material, the heating thereof and in general the application thereof to the web may be accomplished by mechanical means which are the equivalent of those shown and described.

These and other variations may be made without departing from the principles herein set forth and the invention is therefore to be broadly construed and not to be limited except by the character of the claims appended hereto.

I claim:
1. A method of forming a heat-sealable water-permeable web of porous filter paper which comprises providing a body of thermoplastic solid material substantially free from volatile solvents, heating said thermoplastic material to a temperature sufficiently only to soften the same, passing an unheated web of said filter paper underneath and substantially in contact with said material, exerting pressure on said material sufficient to cause it to flow and to deposit onto said filter paper in a plurality of spaced lines, said lines being substantially parallel to each other, the area of said filter paper covered by said lines being not over about 25–35% of the total area, chilling the under side of said filter paper simultaneously with the deposition of said lines on the upper side thereof to prevent diffusion of said material through said filter paper, said chilling taking place in the absence of pressure on said material and filter paper, whereby said material is anchored to the filter paper and aqueous liquids are adapted to pass through said filter paper freely.

2. A method according to claim 1 in which said chilling is of the surface of said filter paper opposite to the surface on which said plastic material is deposited.

3. A method according to claim 1 in which said plastic material at room temperatures is non-flowable.

4. A method according to claim 1 in which said plastic material at room temperatures is non-flowable and is substantially free from plasticizers.

5. A method according to claim 1 in which pressure is applied to said plastic material on said filter paper after said material has been chilled and set on said filter paper.

6. A method according to claim 1 in which pressure is applied to said plastic material on said filter paper after said material has been chilled and set on said filter paper and said lines are of oval cross-section.

7. A method according to claim 1 in which said plastic material is polyethylene.

References Cited in the file of this patent
UNITED STATES PATENTS

| | | |
|---|---|---|
| 375,478 | Derick | Dec. 27, 1887 |
| 2,313,696 | Yates | Mar. 9, 1943 |
| 2,714,571 | Irion et al. | Aug. 2, 1955 |
| 2,904,448 | Sorg | Sept. 15, 1959 |
| 2,984,342 | Smith | May 16, 1961 |

FOREIGN PATENTS

| | | |
|---|---|---|
| 572,921 | Canada | Mar. 24, 1959 |